(12) United States Patent
Menzel et al.

(10) Patent No.: US 7,167,482 B1
(45) Date of Patent: Jan. 23, 2007

(54) METHOD AND SYSTEM FOR CONFIGURING RADIO INTERFACE IN A COMMUNICATION SYSTEM

(75) Inventors: Christian Menzel, Maisach (DE); Martin Öttl, Weilheim (DE)

(73) Assignee: Siemens Aktiengesellschaft, Munich (DE)

( * ) Notice: Subject to any disclaimer, the term of this patent is extended or adjusted under 35 U.S.C. 154(b) by 654 days.

(21) Appl. No.: 09/308,303

(22) PCT Filed: Nov. 6, 1997

(86) PCT No.: PCT/DE97/02582

§ 371 (c)(1),
(2), (4) Date: May 17, 1999

(87) PCT Pub. No.: WO98/23105

PCT Pub. Date: May 28, 1998

(30) Foreign Application Priority Data

Nov. 18, 1996 (DE) ............................ 196 47 629
Dec. 16, 1996 (DE) ............................ 196 52 303

(51) Int. Cl.
*H04B 7/212* (2006.01)
*H04J 3/06* (2006.01)

(52) U.S. Cl. .................. 370/442; 370/347; 370/337; 370/508

(58) Field of Classification Search ............... 370/442, 370/347, 337, 508
See application file for complete search history.

(56) References Cited

U.S. PATENT DOCUMENTS

| | | | | |
|---|---|---|---|---|
| 5,590,133 A | * | 12/1996 | Billstrom et al. | 370/332 |
| 5,640,395 A | * | 6/1997 | Hamalainen et al. | 370/322 |
| 5,659,545 A | * | 8/1997 | Sowles et al. | 370/324 |

FOREIGN PATENT DOCUMENTS

| | | |
|---|---|---|
| DE | 44 02 903 A1 | 8/1995 |
| DE | 195 34 156 C1 | 10/1996 |
| EP | 0 681 406 A1 | 11/1995 |

OTHER PUBLICATIONS

Evaluation of a MAC Protocol proposed for a General packet Radio Service in GSM, Brasche, pp. 668-672.
A Packet Radio Protocol for Group Communication Suitable for the GSM Mobile Radio Network, Decker, pp. 934-938.

* cited by examiner

*Primary Examiner*—Matthew D. Anderson
*Assistant Examiner*—Yuwen Pan
(74) *Attorney, Agent, or Firm*—Staas & Halsey LLP

(57) ABSTRACT

A method and system for configuring a radio interface between a mobile station and a base station in a time-division multiplex mobile radio system for packet data transmission, wherein time slots for signalling are allocated by the base station to the mobile stations in accordance with a sequence which can be predetermined, independent of packet data transmission. The time for configuration of the radio interface also can be reduced by a plurality of time slots for signalling being combined to form a signalling block, or the signalling to a plurality of mobile stations being carried out within one time slot. This signalling is used to define and set the timing advance.

21 Claims, 5 Drawing Sheets

Downlink direction

Uplink direction

| Congestion Level | Randomization Interval (slices) | Maximum Random Aloha Transmission Length (slices) |
|---|---|---|
| 0 | 8 | 24 |
| 1 | 12 | 16 |
| 2 | 16 | 12 |
| 3 | 20 | 9 |
| 4 | 24 | 6 |
| 5 | 32 | 4 |
| 6 | 48 | 3 |
| 7 | 64 | 2 |

TAold =30, off=3
Transmission time = 468.75-(30+3)=435.75

⟶ AB ⟶

TA definition
e.g. TA=1

TA signalling
e.g. TA=4=1+3
⟵

Set transmission time
TAnew=TAold+TA-off
Transmission time = 468.75-(31+3)=434.75

⟶ AB ⟶

METHOD AND SYSTEM FOR CONFIGURING RADIO INTERFACE IN A COMMUNICATION SYSTEM

BACKGROUND OF THE INVENTION

1. Field of the Invention

The present invention relates to a method and base station system for configuring a radio interface between a mobile station and a base station in a time-division multiplex mobile radio system for packet data transmission.

2. Description of the Prior Art

Connection-oriented concepts and concepts based on logic links may be used to transmit data between two communications terminals. In the case of connection-oriented data transmissions, physical resources must be provided between the two communications terminals throughout the entire time for data transmission.

Permanent provision of physical resources is unnecessary for data transmission via logical links. One example of such data transmission is packet data transmission. In this case, a logic link exists between the two communications terminals throughout the entire duration of data transmission, but physical resources are provided only during the actual transmission times for the data packets. This method is based on the fact that the data are transmitted in short data packets, between which relatively long pauses may occur. In the pauses between the data packets, the physical resources are available for other logic links. A logic link results in a saving of physical resources.

The packet data transmission method known from DE 44 02 903 A1 and EP 0 681 406 A1 can be used in particular for communications systems with limited physical resources. For example, in mobile radio systems such as the GSM mobile radio system (Global System for Mobile Communications), the physical resources in the frequency band—[lacuna] [lacuna] number of frequency channels and time slot—are limited and must be used economically.

The GSM mobile radio system is one example of a time-division multiplex mobile radio system in which time slots within a frequency channel can be split between different communications terminals. The radio station at the network end of a mobile radio network is a base station which communicates with mobile stations via a radio interface. Transmission from a mobile station to the base station is called the uplink direction and transmission from the base station to a mobile station is called the downlink direction. A channel, which is reserved for packet data transmission, is formed by at least one time slot per time-division multiplex frame. Furthermore, the channel is defined by the carrier frequency and any frequency jump sequence.

The GSM mobile radio system was originally conceived for voice transmission, and one channel was reserved for continuous information transmission between the mobile station and the base station. However, for packet data transmission, a common channel is used for packet data transmission for a plurality of mobile stations. In addition to the packet data, signalling information is also transmitted for which a time slot is provided at cyclic intervals within the channel.

The distinction between logic links and physical connections also means that, although a logic link exists for a mobile station, no packet data is transmitted over a certain time interval. However, as long as there is no transmission from the mobile station to the base station, it is impossible for the base station to carry out any measurements relating to the transmission conditions from the mobile station. Previously calculated values lose their validity and must be redefined during renewed allocation of physical channels, or the base station must ensure that the transmission conditions are set in such a manner that reliable transmission is possible in every case. The latter leads, for example, to an excessive, or even maximum, transmission power setting. DE 195 34 156 C1 discloses the determination of the timing advance being suppressed in the absence of specific decision criteria.

As a consequence, the present invention is based on the object of specifying a method at a base station system for improved configuration of a radio interface for packet data transmission.

SUMMARY OF THE INVENTION

According to the present invention, time slots for signalling for the uplink direction are allocated to the mobile stations in accordance with a sequence which can be predetermined. The allocation is independent of packet data transmission from or to the mobile station. As a result of this fixed allocation of a time slot for signalling even to mobile stations to which no physical channel is currently allocated, the base station can carry out continuous measurements with regard to the radio interface in order to define a timing advance. When packet data transmission resumes, immediately valid measurements are therefore available for configuration of the radio interface.

In an alternative method for configuring the radio interface, configuration data relating to the radio interface for a plurality of mobile stations is recombined and transmitted in one time slot for signalling. Such signalling is important for the downlink direction since it contains information relating to the configuration of the radio interface for the mobile station and/or values for the transmission power setting and the timing advance for the transmission time. Since only a small number of details are required per mobile station, [lacuna] it is possible to save, [lacuna] through the combination of configuration data in a message, transmission capacity which is now available for adjacent cell measurements or other signalling information.

In this case, the configuration data for a mobile station can be transmitted together with the configuration data for other mobile stations in a single time slot for signalling in the downlink direction wherein it is repeated or provided with a coding. Or, it may be transmitted error detection, or in a plurality of non-successive time slots for signalling being transmitted. In the latter case, the interleaving provides error protection. It is possible to set the time slots which are combined to form such a signalling block. In the case of such use, for example, of every other time slot for signalling, the time slots in between can be used for adjacent cell measurements.

The proportion of time slots for adjacent cell measurements can be further increased if less configuration data is transmitted (for example only the timing advance) or only a small number of mobile stations need to be supplied. In this case, cyclic adaptation of the combination sequence may be provided. Such adaptation improves the matching of the signalling complexity to the actual requirements of the mobile stations for packet data transmissions.

According to the present invention, a closed control loop for the timing advance can be achieved since time slots for signalling are allocated to mobile stations in the uplink direction and signalling blocks for the mobile stations arrive, with a short time delay, in the downlink direction. Advantageously, only the mobile station and the base station are involved in this control loop. Since, in contrast to packet data transmission, no specific arrangement is required between a mobile station and a data block for this signalling (this is normally carried out in a base station controller), the base station can set the timing advance on its own. In this case, there is no signalling complexity between the base station and the base station controller.

The configuration of the timing advance and the transmission power setting are carried out independently of one another according to a further embodiment of the present invention. The timing advance is defined by a closed control loop between the mobile station and the base station, it being possible to provide a longer cycle between two definitions by suitable selection of the time slots for signalling. Since the motion of the mobile station is relatively slow in comparison with the signal propagation speed, the timing advance need be defined only at intervals of several seconds.

In the process of defining the transmission power setting for the base station, the transmission power is advantageously matched to the mobile station having the poorest transmission conditions on the common channel. To this end, open or closed control loops can be set up independently of the definition of the timing advance. If there are major differences between the transmission powers required for the individual mobile stations and if a plurality of common channels are available, it is advantageous to allocate the mobile stations to the channels on the basis of the transmission power required.

Packet data transmission advantageously carried out in both the uplink and downlink transmission directions independently of one another. As such, a mobile station can transmit data in the uplink direction, or it can receive data from the network in the downlink direction. Packet data transmission in both directions also can be provided for a mobile station. The separation into the uplink and downlink directions allows great flexibility in the use of the radio resources and, of course, in the design of the mobile stations, which possibly only transmit or receive.

According to a further embodiment, in addition to the designations within the mobile radio system for packet data transmission, the mobile stations are designated by abbreviated identifiers. One or more time slots for signalling in the uplink direction are allocated, via the time slots for signalling in the downlink direction, to the mobile stations by means of indicator messages containing abbreviated identifiers and time slot designations. The abbreviated identifiers allow improved resource utilization between the network and the mobile stations via the radio interface since they are independent of addresses, that are known in the network, for the mobile stations.

A self-contained message is advantageously transmitted to the base station from a mobile station within a time slot for signalling. This self-contained message contains, for example, received values (RXLEV, RXQUAL) from the mobile station for signals from the base station. This makes it possible for the base station transmission power to be set immediately for packet data transmission in the downlink direction. Since one closed message is transmitted per time slot, this reduces the time required before the mobile station reception level is available at the base station and reduces the time for configuration of the radio interface. The base station uses transmissions for signalling in the uplink direction to define the timing advance and the reception level at the base stations with regard to the respective mobile station.

The value and control value, or values and control values, defined for the timing advance and the transmission power are transmitted to the mobile station in the downlink direction. This then allows it to make the necessary settings for configuration of the radio interface.

The configuration process is further speeded up if the definition of the timing advance and/or of the reception level of the base station is also carried out from the time slots for packet data transmission. The setting time for the configuration process also can be influenced by the allocation of abbreviated identifiers to mobile stations. If, for example, a plurality of abbreviated identifiers are allocated to one mobile station, the setting time is shortened. It is likewise possible to keep the delay times short by the appropriate choice of specific abbreviated identifiers at the end of a macroframe. Limiting the number of abbreviated identifiers also leads to a capability to reuse a time slot for signalling for a mobile station more quickly and to a shortening of the delay time. The number of abbreviated identifiers is advantageously set to correspond to the transmission conditions and to the number of mobile stations provided for the packet data service.

If a plurality of time slots for signalling in the downlink direction are combined to form a signalling block, then the signalling advantageously takes place simultaneously for a plurality of mobile stations. However, the signalling in the downlink direction can likewise take place within packet data so that, for example, the transmission power setting can be adapted continuously, without using time slots for signalling, and additional time slots are made available for adjacent cell measurement.

The choice of specific transmission block types also allows the signalling complexity to be reduced. If normal transmission blocks (normal bursts) are used, in contrast to so-called access levels, it is possible to define the reception power by averaging over a relatively large number of bits. As a result, the measurement accuracy rises and a smaller number of repeated measurements is required for transmission power setting. Such relatively long transmission blocks are advantageously used for transmission power setting when timing advance values that are already valid are available.

According to an embodiment of the present invention, access blocks having extended preceding and/or subsequent guard time are provided, in the transmissions from the mobile station, in the time slots allocated to it for signalling. The transmission time of the access block is obtained from a preceding transmission time, a signalled timing advance and an offset value. In addition to the defined timing advances, the offset value is taken into account; this being a positive value which ensures that unique transmission times are set with a minimal signalling complexity if the mobile station is moving away from the base station or towards the base station, The offset value must not result in any negative timing advances being transmitted.

The offset value is advantageously chosen such that the range which corresponds to it is greater than the distance which the mobile station can travel between two transmissions for timing advance definition at the maximum permissible speed. This ensures that, even if the mobile station is travelling at maximum speed, the transmission time immediately can be set reliably.

Additional features and advantages of the present invention are described in, and will be apparent from, the Detailed Description of the Preferred Embodiments and the Drawing.

DESCRIPTION OF THE DRAWING

FIG. 4 shows the use of time slots for signaling (Tables 1, 2 and 3); and

DETAILED DESCRIPTION OF THE PREFERRED EMBODIMENTS

Figure 1:
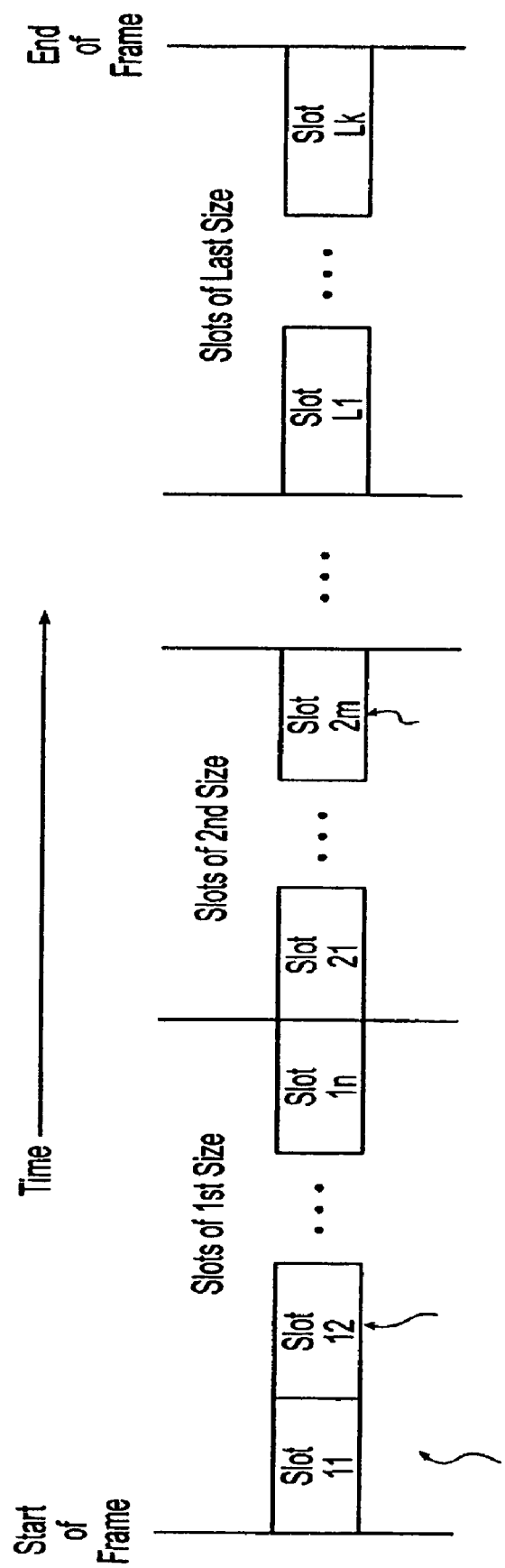
FIG. 1 shows a block diagram of a time-division multiplex mobile radio system for packet data transmission.

The time-division multiplex mobile radio system according to FIG. 1 is, for example, a GSM mobile radio network GSM which contains at least one base station system BSS with a control device BSC and base station BS. Mobile stations MS are located in the radio zone of an illustrated base station BS. The base station system BSS provides the link to other devices in the GSM mobile radio network GSM.

These other devices are, for example, a mobile switching center MSC and a unit for providing interworking functions IWF. The interaction of the mobile switching center MSC and interworking functions IWF results in a packet switching center, which is also called a GSN (GPRS support node). This packet switching center is connected to an MSC for voice switching or, alternatively, it could be implemented as a remote, dedicated unit.

The GSM mobile radio network GSM can be connected to other communications networks. For example, another communications terminal KEG can be connected to the GSM mobile radio network or may itself be part of this GSM mobile-radio network GSM.

The GSM mobile radio network GSM is intended to be used for packet data transmission in parallel with the known voice transmission. In this case, the device for providing interworking functions IWF can provide the coupling of the GSM mobile radio network GSM to data transmission networks and, thus, to the other communications terminal KEG.

Figure 2:
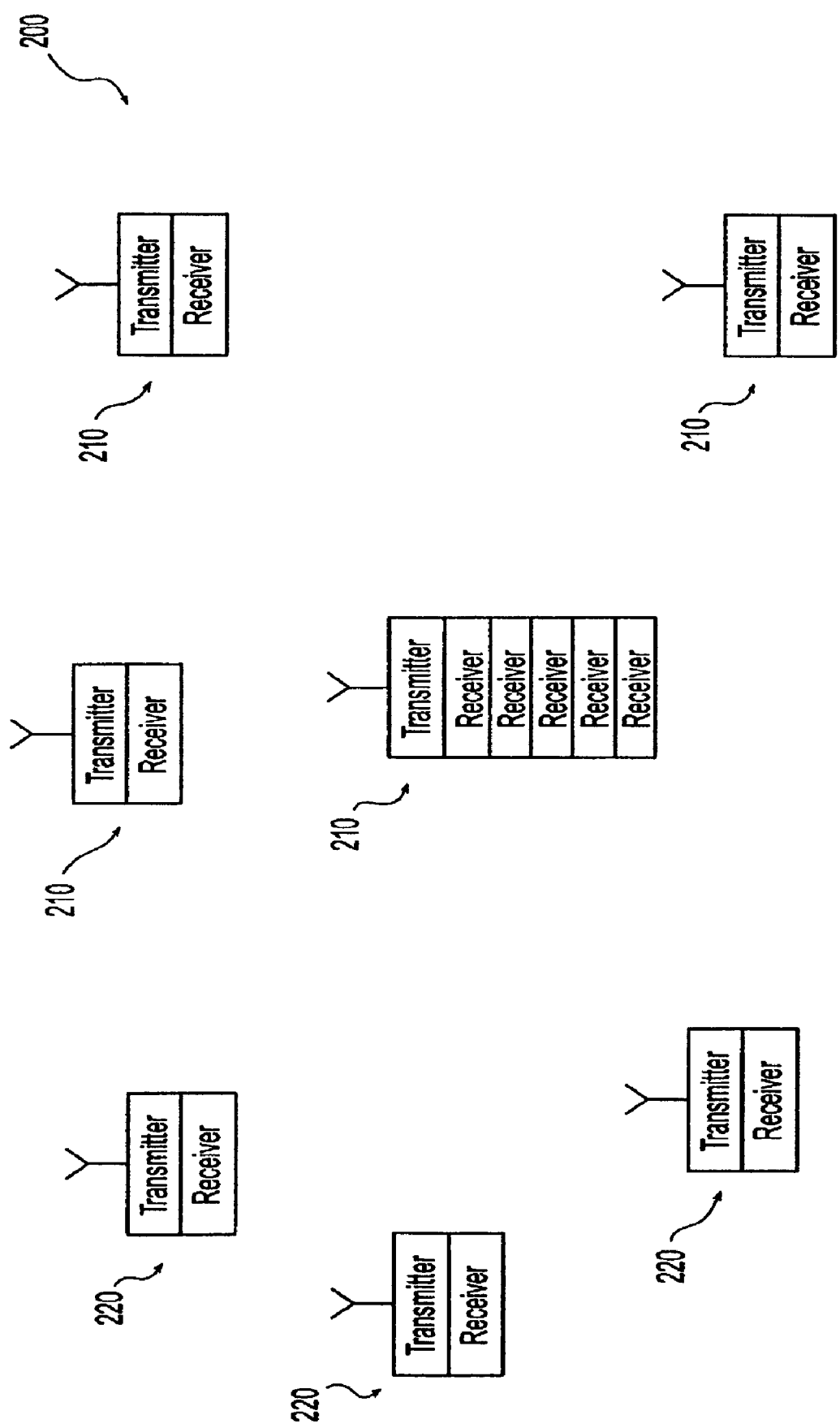
FIG. 2 shows a time-division multiplex frequency channels.

The radio interface between the mobile stations MS and a base station BS is characterized by a frequency and at least one time slot ts. According to FIG. 2, for example, eight time slots ts (ts0 to ts7) are combined to form a frame R. The frame R is repeated cyclically wherein a recurring time slot, for example the time slot ts=ts4, belongs to one channel. Hereafter, this time slot ts is used as the channel GPRS-K for packet data transmission for the purposes of the GPRS (General Packet Radio Services) service.

If a mobile station MS wishes to use this service, it carries out a random access in accordance with the GSM terminology, using a short so-called access burst, and changes to a dedicated control channel. This is followed by authentication and setting of the context with regard to a logic link (standby state). If the other communications terminal KEG wishes to communicate with a mobile station MS via the packet data service, paging and the described random access are carried out at the network end.

For the situation in which the mobile station MS wishes to transmit or receive data packets (ready state), a further random access takes place if a logic link exists. In this case, the mobile station M also is allocated an abbreviated identifier id and the corresponding GPRS channel GPRS-K. The timing advance ta and the reception level pb in the base station BS are then defined at the network end. At this point, the mobile station MS is assigned four successive time slots T as a packet data block TCH in the uplink direction. If required, details relating to transmission power monitoring are also transmitted.

Figure 3:
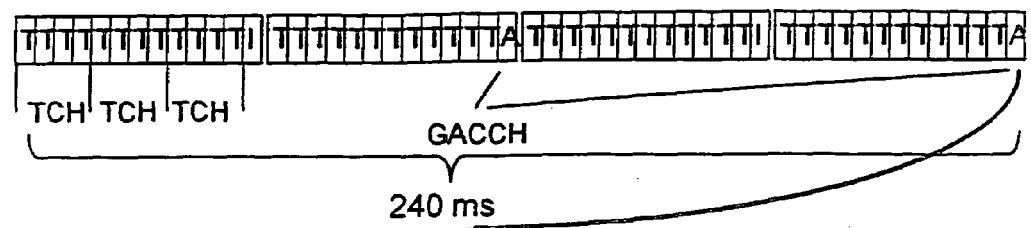
FIG. 3 shows the time slots in a channel for packet data transmission.
Figure 3:
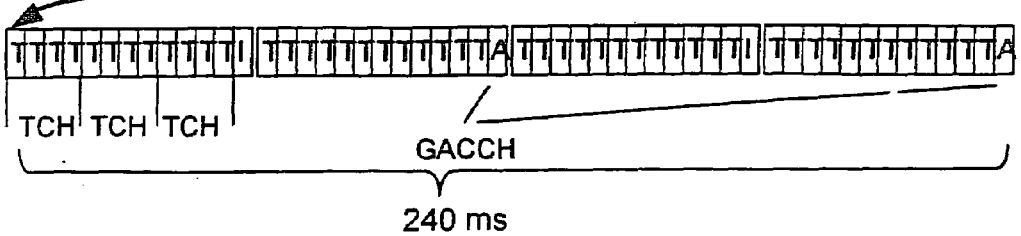
Figure 3:
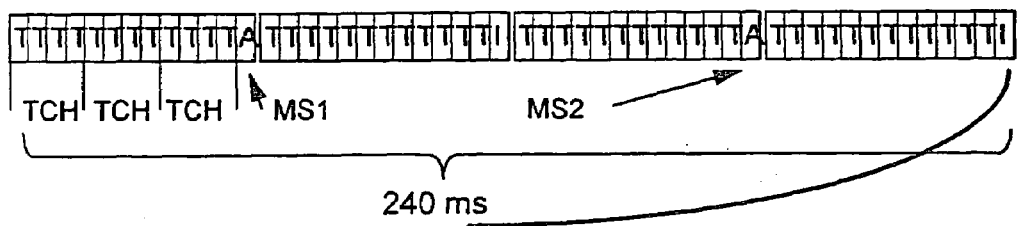
Figure 3:
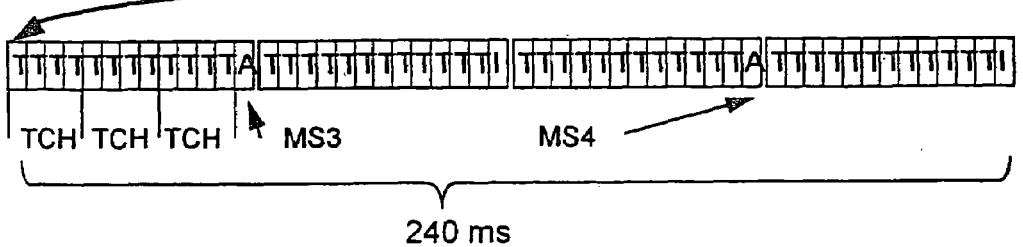

The packet data transmission and the associated signalling will now be described with reference to FIG. 3 and FIG. 4.

Four time slots T for packet data transmission are, in each case, combined to form a packet data block TCH. Three such packet data blocks TCH and one time slot A, I for signalling are repeated four times to form a macroframe which includes 52 frames R. This applies to both the uplink direction and the downlink direction. Furthermore, two such macroframes, in turn, form a higher-order frame. One macroframe has a duration of 240 ms.

The information in a packet data block TCH is interlinked with four time slots T. The allocation of packet data blocks TCH to different mobile stations MS is carried out in a flexible manner, in both the uplink and downlink directions, to one or more mobile stations MS. This allows different data rates to be used. Decisions relating to access to the GPRS channel between the mobile stations MS can be made on the basis of priority allocations. The uplink direction and the downlink direction are considered separately in the following text wherein a mobile station MS is always able to communicate in both directions. The allocation of packet data blocks TCH while a logic link exists is carried out in band, that is to say, within the packet data blocks TCH, Indicator messages are used to indicate to the mobile stations MS who may use the following packet data blocks TCH.

In the downlink direction, not only are four successive time slots T for packet data transmissions interleaved, but the signalling information which forms a signalling block GACCH is also interleaved. In this case, according to FIG. 3, every other time slot A for signalling is combined to form the signalling block GACCH, while the intermediate time slots I are used for measurements relating to mobile stations MS in adjacent cells.

The time slots A, I for signalling and adjacent channel measurement also may be in a different sequencer; for example, A/I=⅓. The base station BS switches between the sequences on the basis of the transmission conditions.

The adjacent cell measurements are used to determine which base stations BS can be selected in the event of a deterioration in the transmission conditions on the currently allocated channel. The mobile station contains a priority list based on these measurements.

A signalling block GACCH in this case contains information for a plurality of mobile stations MS, see FIG. 4, Table 1 and Table 2 in this context. Alternatively, as shown in Table 3, it is possible to reduce the number of time slots per signalling block GACCH and, in addition to or as an alternative to interleaving, to transmit the configuration data (timing advance TA and/or transmission power setting PC) more than once in a time slot and/or to provide it with further protections; for example, by coding.

The method according to the present invention is particularly advantageous if the timing advance is defined only once and is signalled as indicated below. The transmission power determination is carried out independently of this. Such separation of the determination of the two configuration data items TA, PC provides greater flexibility for the configuration of the radio interface. However, for simplicity, the following text assumes that an identical control loop is used for defining the timing advance TA and the transmission power setting PC.

For example, the GACCH block contains the values for the timing advance TA and the transmission power setting PC (for example, the reception level pb of the base station BS or the required transmission power) for the mobile stations 1 to 4. In this case, the time period before the timing advance TA and the transmission power values PC are repeated is thus 480 ms. If signalling takes place for only two mobile stations, for example two mobile stations which are transmitting in the uplink direction, the number of abbreviated identifiers id can be reduced to two, and the delay time is now 240 ms.

In the uplink direction, the time slots A for signalling are allocated as follows. According to Table 1, the time slots A0 to A1 are allocated for the mobile stations 1 to 2 in the uplink direction (abbreviated identifiers id 0 to 1), and the time slots A2 to A3 are allocated for the mobile stations MS 2 to MS 3 in the downlink direction (abbreviated identifiers id 2 to id3). If the mobile stations MS are communicating in both the uplink and downlink directions, then the time slots A for signalling are allocated in accordance with Table 2.

If the allocation is carried out according to Table 1, that is to say the uplink direction and downlink direction are considered separately, each mobile station MS transmits a specially coded access burst to the base station BS in the time slot A allocated to it for signalling. In this process, it signals the field strength and quality (RXLEV, RXQUAL) with which the signalling blocks GACCH from the base station BS have been received in the downlink direction. The base station BS measures the transmissions (time slots A allocated for signalling) from the mobile station MS in order to define a timing advance TA and a transmission power, or the transmission power change PC for the mobile station MS, and signals this to the mobile station MS. The mobile station MS thus receives values which it uses when packet data blocks TCH are transmitted in the uplink direction.

The base station BS uses the reception level pm reported by the mobile station MS to set a reasonable transmission power when, subsequently, packet data blocks TCH are transmitted to the mobile station MS for data transmission in the downlink direction. The delay times for the current values of the timing advances TA and transmission power values in the uplink direction are as follows: The mobile station MS receives new values at an interval of 480 ms. With regard to the sequence of the time slots I, A, it should be noted that the time between signalling in the uplink direction by a mobile station MS and a transmission provided for this mobile station MS in the downlink direction is short.

According to Table 3, the signalling in the downlink direction has been designed such that each mobile station 1 to 4 has been assigned an individual time slot A for signalling. In such time slot A the timing advance TA is transmitted with additional error protection. The fewer the number of mobile stations which are using the common channel GPRS-K, the fewer is the number of such time slots A that are required for signalling and the greater is the number of time slots I that are available either for adjacent cell measurements, for additional signalling (for example link clearing, frequency changing) or for additional data transmission.

The exemplary embodiments can be modified such that abbreviated identifiers id are used in such a manner that the abbreviated identifiers id 1 and 3 are used by preference. In this case, the delay times are close to the best case of 240 ms. The interval between the arrival of new values also is reduced if the abbreviated identifiers id are used twice. If the number of abbreviated identifiers is further limited, then the delay time is shortened. If non-updated values are acceptable for relatively long times, then the number of abbreviated identifiers id also can be increased in steps of four to 8, 12, 16 etc.

The allocation of abbreviated identifiers id is matched, in particular to the transmission conditions. That is, they are matched to the previously recorded changes in the timing advance TA and transmission power changes. The number of mobile stations MS which wish to use packet data transmission via the GPRS channel GPRS-K is also taken into account.

As a result of the fixed allocation of time slots A for signalling in the uplink direction, the base station BS is continuously informed of the current transmission conditions for the radio interface, and can configure the radio interface accordingly. A closed control loop exists for mobile stations MS which signal in such a manner in the uplink direction and to which the values for the timing advance TA and for the transmission power setting PC are transmitted in the downlink direction via the signalling blocks GACCH. The control loop is also feasible when the mobile station MS is not currently transmitting or receiving packet data.

However, if the mobile station MS is also allocated packet data blocks TCH in the uplink or downlink directions, values for the timing advance TA or the reception level pb also can be calculated and transmitted for this purpose.

Access radio blocks AB according to FIG. 4 are transmitted in the uplink direction. An original timing advance of TAold=30 is assumed. The base station uses the transmissions to define the timing advance TA (for example TA=1 for a mobile station MS which is moving away from the base station BS). The access radio block AB transmitted for signalling in the time slot A includes a synchronization sequence sync followed by a data section data. The access radio block AB is preceded by a guard time of 8 bits and is followed by a guard time of 3 bits. The radio-frequency transmission stabilizes in the guard times. Furthermore, an offset value off of 3 bits is shown, which influences the setting of the transmission time.

Figure 5:
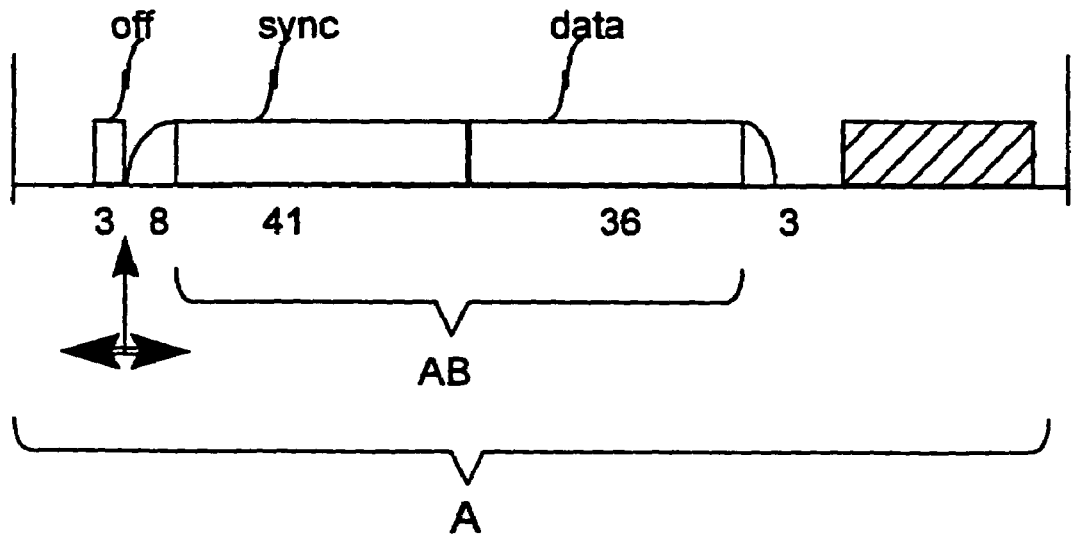
FIG. 5 shows the setting of the timing advance for an access block in the uplink direction.

The basic setting of the transmission time of 468.75 bits shown in FIG. 5 corresponds to the timeframe offset between the downlink and uplink directions known from the GSM mobile radio system.

The mobile station MS defines a new timing advance TAnew (TAnew=TAold+TA−off) on the basis of a timing advance TA (in the value range from 0 to 64) which has been defined by the base station. BS, which has had the offset value off applied to it and which has been signalled in the downlink direction. The current transmission time for transmitting the next access block AB in the uplink direction is set by taking account of the basic setting and subtracting the new timing advance TAnew as well as the offset value off.

This avoids any necessity to signal negative timing advances TA, even if the mobile station MS is approaching the base station BS. Errors which occur in the measurement and/or setting of the timing advance TA do not accumulate but are corrected in the following adjustment. As a result of the unique transmission of the timing advance TA, the mobile station MS has available a setting value for the transmission time in the time slot A for signalling and in the time slot T for packet data transmission.

The choice of the offset value off of 3 bits allows the transmission time continuously to be set correctly even at a maximum speed of 500 km/h and with a repetition period of the definition of the timing advance of 4 s. In addition, this value does not unnecessarily shorten the guard time either so that, if required, an additional radio block can be transmitted in the same time slot A for signalling.

The method according to the invention is particularly suitable for supporting packet-oriented transmission of information via the radio interface for telematics applications, fax and file transmission, point of sales implementations, fleet management and traffic management systems.

Indeed, although the present invention has been described with reference to specific embodiments, those of skill in the art will recognize that changes may be made thereto without departing from the spirit and scope of the invention as set forth in the hereafter appended claims.

What is claimed is:

1. A method for configuring a radio interface between a mobile station and a base station of a time-division multiplex mobile radio system for packet data transmission, the method comprising:
   defining a transmission from a mobile station to the base station as an uplink direction;
   defining a transmission from the base station to a mobile station as a downlink direction;
   forming a channel by at least one time slot per time-division multiplex frame, wherein the packet data transmission from a plurality of mobile stations takes place via the channel;
   combining frames to form a macroframe;
   providing a time slot for signaling at cyclic intervals in the channel; and
   allocating, by the base station, one time slot exclusively for signaling in the uplink direction from a respective mobile station in accordance with a predeterminable sequence of the mobile stations, where even if the respective mobile station does not transmit any packet data for the duration of a current and next macroframe, the respective mobile station may transmit in the allocated time slot for signaling.

2. The method as claimed in claim 1, further comprising:
   determining a timing advance for the respective mobile station from transmissions by the mobile station in the allocated time slot; and
   transmitting the timing advance in a time slot for signaling in the downlink direction to the corresponding mobile station.

3. The method as claimed in claim 1, further comprising:
   defining the timing advance and values for a transmission power setting independently of one another.

4. The method as claimed in claim 3, further comprising:
   defining, additionally, the timing advance and the values for the transmission power setting from the time slots for packet data transmission.

5. The method as claimed in claim 1, further comprising:
   using transmission block types of a predetermined size for specific configuration data in the time slots for signaling in the uplink direction.

6. The method as claimed in claim 1, further comprising:
   transmitting configuration data defined in the downlink direction in time slots for packet data transmission.

7. The method as claimed in claim 1, further comprising:
   providing, by the base station, the timing advance for the configuration of the radio interface without being controlled by a base station controller.

8. The method as claimed in claim 1, further comprising:
   combining a plurality of time slots for signaling to form a signaling block.

9. The method as claimed in claim 8, further comprising:
   combining the time slots for signaling in accordance with a sequence which can be predetermined, wherein remaining time slots are provided for an adjacent cell measurement of the mobile station.

10. The method as claimed in claim 1, further comprising:
    providing information in time slots for signaling with additional coding.

11. The method as claimed in claim 1, further comprising:
    enabling the packet data transmission to take place in both the uplink and downlink directions independently of one another.

12. The method as claimed in claim 1, further comprising:
    designating, additionally, the mobile stations for packet data transmission by abbreviated identifiers; and
    allocating, via the time slots for signaling in the downlink direction, one or more time slots for signaling in the uplink direction to the mobile stations by means of indicator messages which contain abbreviated identifiers and time slot designations.

13. The method as claimed in claim 1, further comprising:
    transmitting, by a mobile station per time slot for signaling in the uplink direction, a self-contained message which contains a reception level of the mobile station.

14. The method as claimed in claim 1, further comprising:
    providing transmissions, from the mobile station in the time slots for signaling allocated to it, access blocks having an extended preceding or subsequent guard time, whose transmission time results from a preceding transmission time, a signaled timing advance and an offset value.

15. The method as claimed in claim 14, further comprising:
    choosing the offset value such that a range which corresponds to the offset value is greater than the distance which the mobile station can travel between two transmissions for timing advance definitions at a maximum permissible speed.

16. A base station system for configuring a radio interface between a mobile station and a base station of a time-division multiplex mobile radio system for packet data transmission, comprising:
    a base station;
    a plurality of mobile stations, wherein a transmission from a mobile station to the base station is defined as an uplink direction, and a transmission from the base station to a mobile station is defined as a downlink direction;
    a channel formed by at least one time slot per time-division multiplex frame, wherein the packet data transmission from the plurality of mobile stations takes place via the channel;
    a macroframe formed from a combination of frames;
    a time slot for signaling provided at cyclic intervals in the channel; and
    a control device to allocate time slots to the plurality of mobile stations, wherein one time slot for signaling in the uplink direction is allocated exclusively to a respective mobile station according to a predeterminable sequence of the mobile stations, the allocation being independent of any packet data transmission so that the mobile station may transmit in the time slot allocated for signaling even if the mobile station does not transmit any packet data for the duration of a current and next macroframe.

17. The base station system as claimed in claim 16, wherein timing advances for the mobile stations are transmitted as configuration data for the plurality of mobile stations in a time slot for signaling in the downlink direction.

18. A method for configuring a radio interface between a mobile station and a base station of a time-division multiplex mobile radio system for packet data transmission, the method comprising:

defining a transmission from a mobile station to the base station as an uplink direction;

defining a transmission from the base station to a mobile station as a downlink direction;

forming a channel by at least one time slot per time-division multiplex frame, wherein the packet data transmission from a plurality of mobile stations takes place via the channel;

combining frames to form a macroframe;

providing a time slot for signaling at cyclic intervals in the channel; and allocating, by the base station, one time slot exclusively for signaling in the uplink direction from a respective mobile station in accordance with a predeterminable sequence of the mobile stations, where even if the respective mobile station does not transmit any packet data for the duration of a current and next macroframe, the respective mobile station transmits in the allocated time slot for signaling.

19. A base station system for configuring a radio interface between a mobile station and a base station of a time-division multiplex mobile radio system for packet data transmission, comprising:

a base station;

a plurality of mobile stations, wherein a transmission from a mobile station to the base station is defined as an uplink direction, and a transmission from the base station to a mobile station is defined as a down link direction;

a channel formed by at least one time slot per time-division multiplex frame, wherein the packet data transmission from the plurality of mobile stations takes place via the channel;

a macroframe formed from a combination of frames;

a time slot for signaling provided at cyclic intervals in the channel; and a control device to allocate time slots to the plurality of mobile stations, wherein just-one time slot for signaling in the uplink direction is allocated exclusively to a respective mobile station according to a predeterminable sequence of the mobile stations, the allocation being independent of any packet data transmission so that the mobile station transmits in the time slot allocated for signaling even if the mobile station does not transmit any packet data for the duration of a current and next macroframe.

20. A mobile station for configuring a radio interface between the mobile station and a base station of a time-division multiplex mobile radio system for packet data transmission, comprising:

a transmission from the mobile station to the base station defined as an uplink direction, and a transmission from the base station to the mobile station defined as a downlink direction;

a channel formed by at least one time slot per time-division multiplex frame, wherein the packet data transmission to the base station takes place via the channel;

a macroframe formed from a combination of frames;

a time slot for signaling provided at cyclic intervals in the channel;

means for receiving an allocation of ju6t-one time slot for signaling in the uplink direction exclusively by said mobile station, wherein the time slot is selected according to a predeterminable sequence of mobile stations, the allocation being independent of any packet data transmission; and means for transmitting in the time slot allocated for signaling even if no packet data is transmitted for the duration of a current and next macroframe.

21. A mobile station for configuring a radio interface between the mobile station and a base station of a time-division multiplex mobile radio system for packet data transmission, comprising:

a transmission from the mobile station to the base station defined as an uplink direction, and a transmission from the base station to the mobile station defined as a downlink direction;

a channel formed by at least one time slot per time-division multiplex frame, wherein the packet data transmission to the base station takes place via the channel;

a macroframe formed from a combination of frames;

a time slot for signaling provided at cyclic intervals in the channel;

means for receiving an allocation of one time slot for signaling in the uplink direction exclusively by said mobile station, wherein the time slot is selected according to a predeterminable sequence of mobile stations, the allocation being independent of any packet data transmission; and means for transmitting, wherein the transmitting means may transmit in the time slot allocated for signaling even if no packet data is transmitted for the duration of a current and next macroframe.

* * * * *